US008820684B2

(12) United States Patent
McKinnon et al.

(10) Patent No.: US 8,820,684 B2
(45) Date of Patent: Sep. 2, 2014

(54) SPACECRAFT HEAT DISSIPATION SYSTEM (75) Inventors: Douglas V. McKinnon, Princeton, NJ (US); Timothy P. Moran, Hackettstown, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 620 days.

(21) Appl. No.: 12/730,457

(22) Filed: Mar. 24, 2010

(65) Prior Publication Data
US 2010/0243817 A1 Sep. 30, 2010

Related U.S. Application Data (60) Provisional application No. 61/162,995, filed on Mar. 24, 2009.

(51) Int. Cl.
*B64G 1/52* (2006.01)
*B64G 1/50* (2006.01)

(52) U.S. Cl.
CPC *B64G 1/50* (2013.01); *B64G 1/506* (2013.01); *B64G 1/503* (2013.01)
USPC .................................................... 244/171.8

(58) Field of Classification Search
USPC ........ 244/171.8, 117 A; 165/41, 171, 104.14, 165/104.22, 904
See application file for complete search history.

(56) References Cited

U.S. PATENT DOCUMENTS

| | | | | |
|---|---|---|---|---|
| 4,161,212 A | * | 7/1979 | Hightower | 165/96 |
| 5,332,030 A | * | 7/1994 | Spencer et al. | 165/274 |
| 5,351,746 A | * | 10/1994 | Mackey et al. | 165/41 |
| 5,735,489 A | * | 4/1998 | Drolen et al. | 244/171.8 |
| 5,806,803 A | * | 9/1998 | Watts | 244/171.8 |
| 5,823,477 A | * | 10/1998 | York | 244/171.8 |
| 6,230,790 B1 | | 5/2001 | Hemingway et al. | |
| 6,626,231 B2 | * | 9/2003 | Cluzet et al. | 165/41 |
| 6,776,220 B1 | * | 8/2004 | Low et al. | 165/41 |
| 7,118,076 B2 | * | 10/2006 | Tjiptahardja et al. | 244/171.8 |
| 7,270,302 B1 | | 9/2007 | Wong et al. | |
| 7,363,960 B2 | | 4/2008 | Low et al. | |
| 7,513,462 B1 | * | 4/2009 | McKinnon et al. | 244/173.1 |
| 8,240,612 B2 | * | 8/2012 | Jondeau et al. | 244/171.8 |
| 2002/0139512 A1 | * | 10/2002 | Low et al. | 165/41 |
| 2003/0051857 A1 | * | 3/2003 | Cluzet et al. | 165/41 |
| 2004/0040691 A1 | * | 3/2004 | Jacque et al. | 165/42 |
| 2004/0188568 A1 | * | 9/2004 | Gayrard et al. | 244/163 |
| 2010/0001141 A1 | * | 1/2010 | Jondeau et al. | 244/158.1 |

OTHER PUBLICATIONS

International Search Report for PCT/US2010/028464 dated May 26, 2010.

* cited by examiner

*Primary Examiner* — Tien Dinh
*Assistant Examiner* — Michael A Fabula
(74) *Attorney, Agent, or Firm* — McDermott Will & Emery LLP (57) ABSTRACT A spacecraft is provided. The spacecraft comprises a plurality of heat generating electrical components. A first thermal radiator panel and a second thermal radiator panel are provided on the spacecraft, each panel being thermally coupled to the heat generating electrical components. Heat pipes are also provided. At least one first heat pipe is externally attached to the first thermal radiator panel and at least one second heat pipe is externally attached to the second thermal radiator panel. The at least one first heat pipe is thermally coupled to the at least one second heat pipe.

13 Claims, 8 Drawing Sheets

SPACECRAFT HEAT DISSIPATION SYSTEM

CROSS-REFERENCE TO RELATED APPLICATIONS

This patent application claims priority to U.S. Provisional Patent Application Ser. No. 61/162,995, filed Mar. 24, 2009 which is incorporated herein by reference in its entirety.

BACKGROUND OF THE INVENTION

The present disclosure relates to satellites and more particularly to an improved waste heat removal system for spacecraft, including satellites.

The thermal control systems used in geostationary satellites (satellites using a geosynchronous orbit and commonly referred to as GEO satellites) typically rely on north and south facing panels to reject most of their waste heat and maintain thermal balance. For many GEO satellites, the capacity of these north/south thermal radiators is a key design driver that often serves to limit the overall satellite's capacity. Consequently, improvements in the efficiency of these heat removal systems can significantly improve overall satellite design capabilities and capacity. Furthermore, in order to maximize satellite design applicability and competitiveness, there is a need to do this in a modular and cost efficient manner.

Differential solar illumination as a function of inclination of the earth's axis towards the sun (the seasons) drives thermal radiator inefficiency. Specifically, during the half year centered about the summer solstice, a GEO satellite's north panel is heated by the sun and the south panel is in shadow. Likewise, during the half year centered about the winter solstice, a GEO satellite's south panel is heated by the sun while the north panel is in shadow. A thermal mapping of the spacecraft shows distinct temperature differentials between the north and south radiator panels on a satellite. The differences are a direct result of the solar conditions relative to the GEO satellite orbit.

This seasonal aspect of GEO satellite solar heating drives the basic sizing and capacity of a spacecraft's primary thermal radiators. Specifically, the north thermal radiator is sized to maintain all north panel components within its operational temperature limits when the panel is hottest, i.e. during the summer solstice. The south panel is likewise designed for winter solstice conditions. As such, north and south thermal radiator panels typically have excess thermal capacity for all but the worst case times of the year. This excess capacity is inefficient. The magnitude of the inefficiency is a function of how well the satellite's thermal system can transport heat between the north and south radiator panels.

As power capability requirements for spacecraft increase, spacecraft thermal dissipation requirements will continue to grow and future satellite designs will require greater thermal dissipation capacity.

Accordingly, it is desirable to exploit the seasonal excess thermal capacity by providing a cost effective modular system suitable for use on multi-mission satellite platforms that must accommodate payloads with varying equipment complements and dissipation requirements.

SUMMARY OF THE INVENTION

A spacecraft is provided. The spacecraft comprises a plurality of heat generating electrical components. A first thermal radiator panel and a second thermal radiator panel are provided on the spacecraft, each panel being thermally coupled to the heat generating electrical components. Heat pipes are also provided. At least one first heat pipe is externally attached to the first thermal radiator panel and at least one second heat pipe is externally attached to the second thermal radiator panel. The at least one first heat pipe is thermally coupled to the at least one second heat pipe.

A radiator system for a spacecraft is provided. The system comprises a first thermal radiator panel and a second thermal radiator panel. At least one first heat pipe is externally attached to an outer face of the first thermal radiator panel and at least one second heat pipe is externally attached to an outer face of the second thermal radiator panel. The at least one first heat pipe is thermally coupled to the at least one second heat pipe. At least one third heat pipe is externally attached to the outer face of the first thermal radiator panel and at least one fourth heat pipe is externally attached to the outer face of the second thermal radiator panel. The at least one third heat pipe is thermally coupled to the at least one fourth heat pipe and the at least one third heat pipe is thermally coupled to the at least one first heat pipe at the first thermal radiator panel. The at least one fourth heat pipe is thermally connected to the at least one second heat pipe at the second thermal radiator panel.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
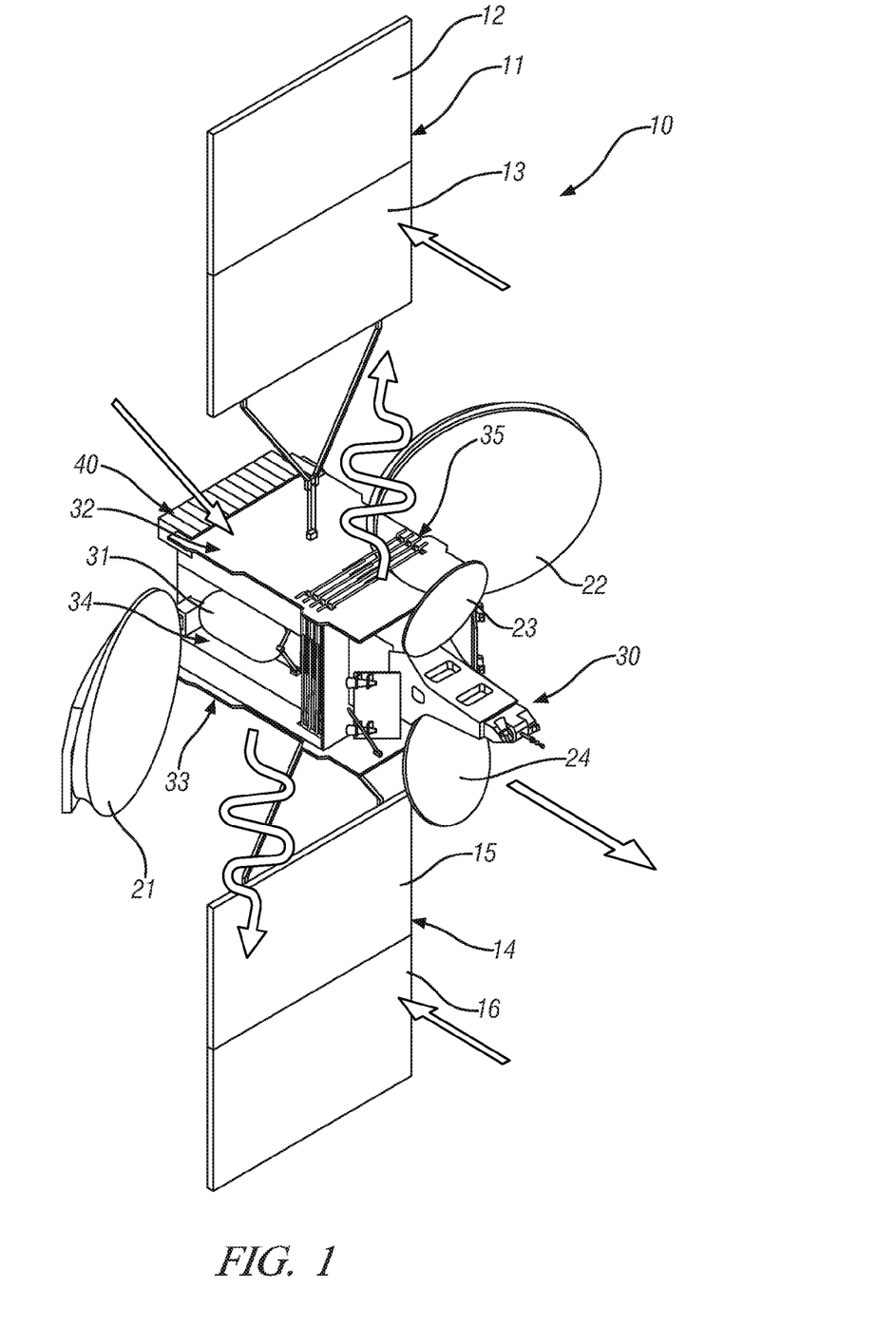
FIG. 1 is a pictorial view of a satellite in accordance with the invention.

Referring now to the Figures, where the invention will be described with reference to specific embodiments, without limiting same, FIG. 1 shows a spacecraft or satellite 10 in accordance with the invention. In the exemplary embodiment shown, spacecraft 10 is a communications satellite configured for geostationary orbit around the earth. As such, spacecraft 10 is configured to maintain a generally constant orientation relative to the earth as it orbits about the earth. The following detailed description will describe certain elements of spacecraft 10 relative to each other by reference to direction on the earth. However, the nomenclature used is for convenience only and is not intended to be limiting to direction. It will be appreciated that like elements are described with like numerals throughout this disclosure. Where alternate embodiments of like elements are shown, a prefix numeral may be added to distinguish the element from alternate embodiments.

Spacecraft 10 includes a north solar array 11 comprised of solar panels 12 and 13 and a south solar array 14 comprised of solar panels 15 and 16. The spacecraft 10 further includes a variety of antennas 21, 22, 23 and 24. Spacecraft 10 is packed with fuel tanks 31 for facilitating propulsion of the spacecraft. Spacecraft 10 includes a nadir face (earth facing face) 30, north face 32, a south face 33 and east and west faces 34, 35, respectively. An anti-nadir face 36, opposite nadir face 30, in conjunction with fuel tanks 31, facilitates acquiring and maintaining orbit of the spacecraft 10. As seen in FIG. 1, antenna 21 is mounted to east face 34, antenna 22 is mounted to west face 35, while antennas 23 and 24 are mounted to nadir face 30.

Figure 2:
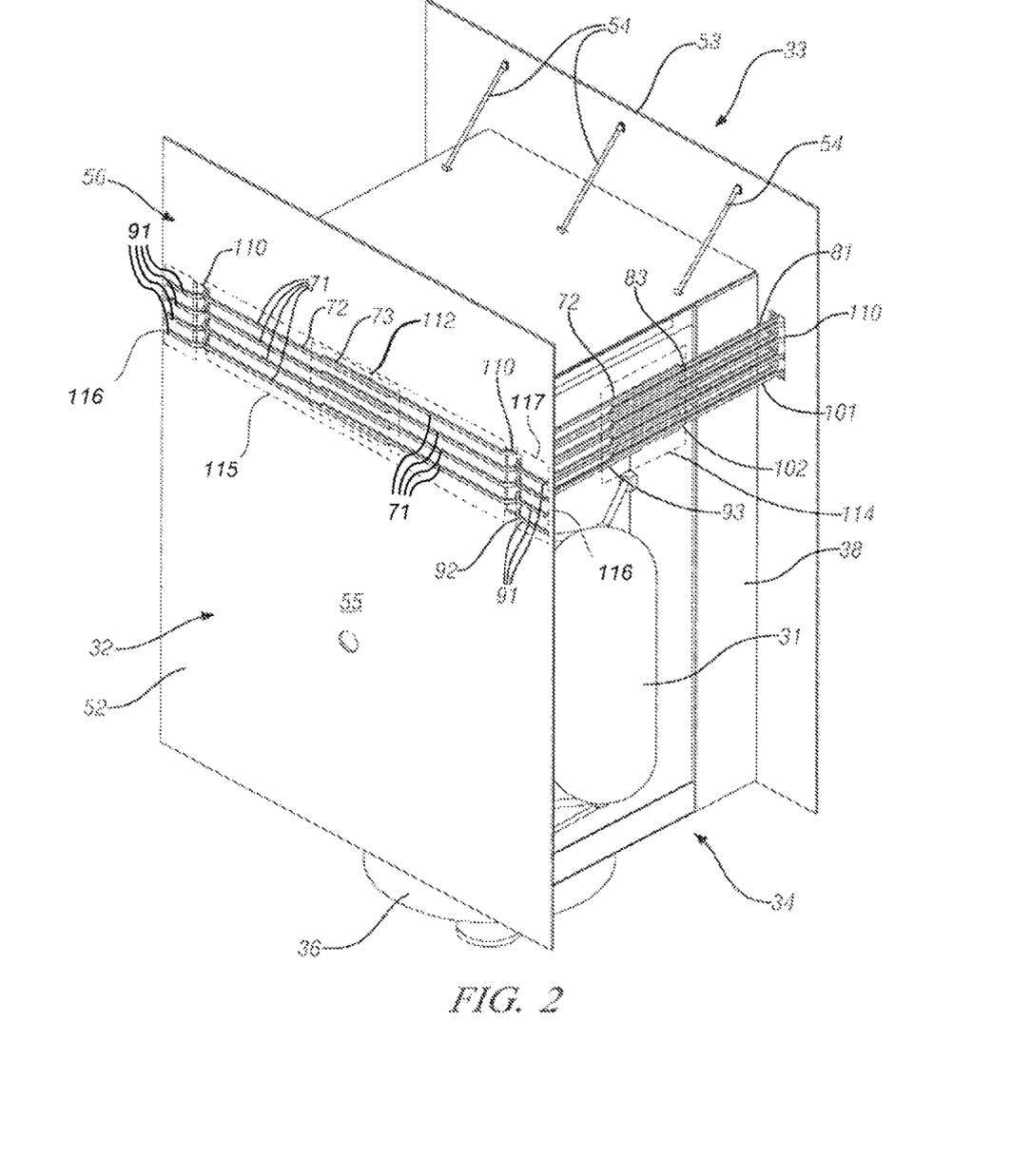
FIG. 2 is an isometric view of the north face of a spacecraft in accordance with the invention.
Figure 3:
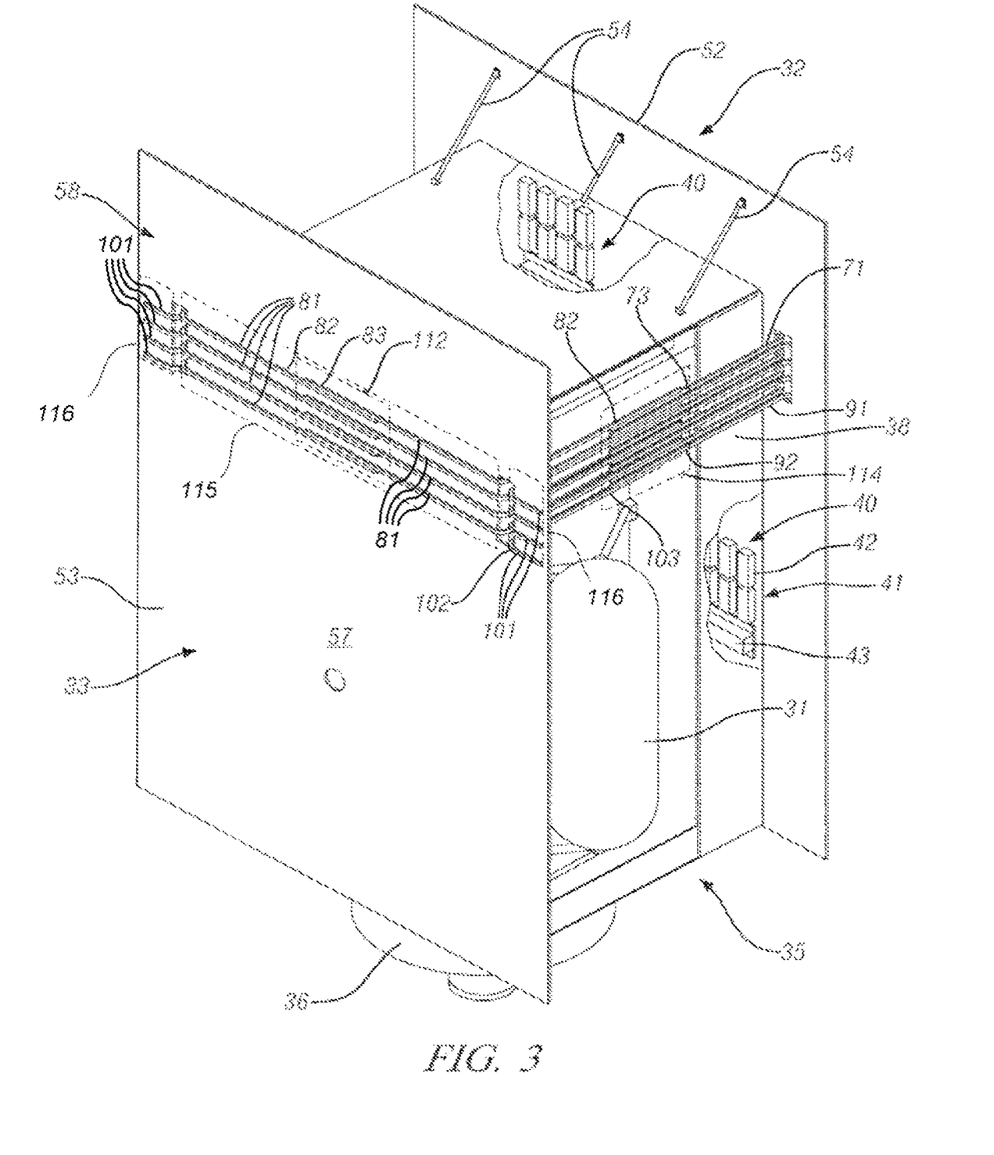
FIG. 3 is an isometric view of the south face of a spacecraft in accordance with the invention.

Referring now to FIGS. 2 and 3, an isometric view of spacecraft 10 is shown. Appendages such as solar arrays 11 and 14 and antennas 21-24 have been removed for clarity to expose a housing 38 within which the core operational components of spacecraft 10 are contained. To be economically feasible and competitive, typical multi-mission spacecraft 10, such as the communications satellite of the exemplary embodiment disclosed herein, must accommodate various types and quantities of equipment as efficiently as possible. This equipment, shown in FIG. 1 and in two cut-away sections of FIG. 3, includes various heat generating electrical components 40. Electrical components 40 often come from different manufacturers and have varying operational temperature constraints.

For example, referring again to FIG. 3, electrical components 40 in an exemplary embodiment may include traveling wave tube amplifiers 41, which can generate approximately 40 to 50 percent of a typical communications satellite's waste heat that must be dissipated. Further, traveling wave tube amplifiers 41 are composed of two components, traveling wave tubes (TWTs) 42 and electronic power conditioners (EPCs) 43. In many situations, each of TWTs 42 and EPCs 43 has significantly different temperature constraints, with EPCs 43 requiring a lower operating temperature limit than TWTs 42.

Figure 4:
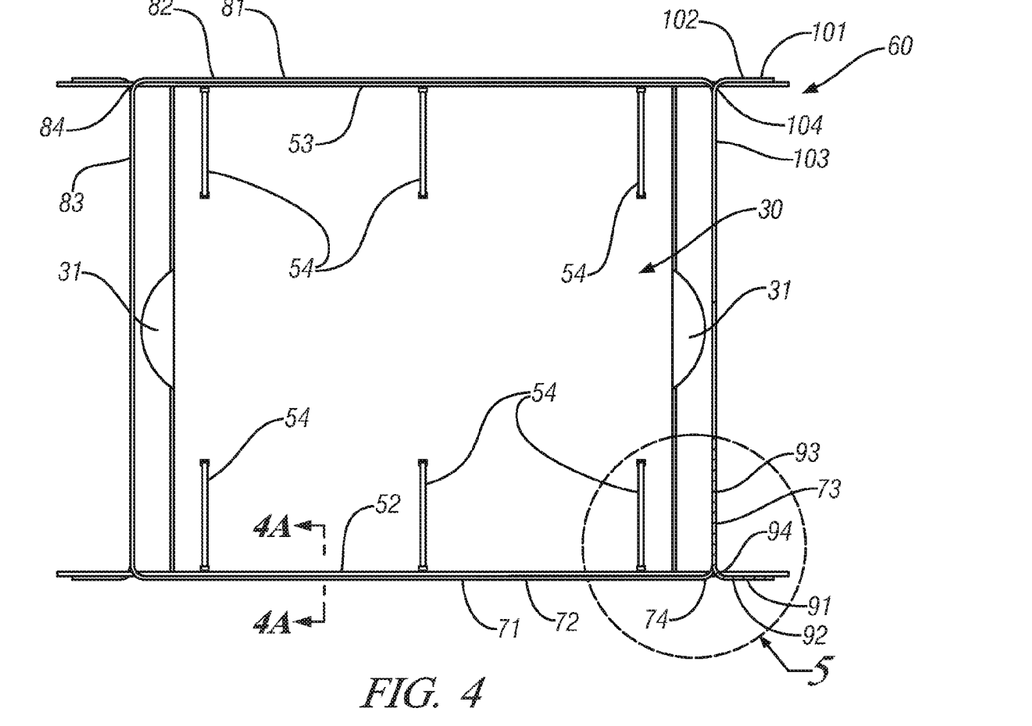
FIG. 4 is a nadir face view of the spacecraft in accordance with the invention.

As best seen in FIGS. 2-4, mounted to the north face 32 of housing 38 is a first or north thermal radiator panel 52, while a second or south thermal radiator panel 53 is mounted to the south face 33 of housing 38. Referring specifically to FIG. 4, like FIGS. 2 and 3, appendages such as solar arrays 11 and 14 and antennas 21-24 have been removed for clarity to expose a housing 38. Each radiator panel 52, 53 is mechanically attached to housing 38 and is attached to nadir face 30 via various attachment means, including struts 54. Radiator panel 52 includes a central heat dissipation zone 55 surrounded by an edge heat dissipation zone 56 found along the perimeter of radiator panel 52. Radiator panel 53 includes a central heat dissipation zone 57 surrounded by an edge heat dissipation zone 58 found along the perimeter of radiator panel 53. The heat dissipation capacity of radiator panels 52, 53 is one of the determinative factors in overall satellite capacity.

For example, in order to accommodate the different components 40, thermal radiator panels 52, 53 are designed to maintain temperatures within the constraints of the most sensitive equipment or components 40. Components 40 with lowest allowable temperature drive overall thermal radiator panel 52, 53 efficiency. Furthermore, to minimize absorbed solar energy, a typical geostationary satellite, such as spacecraft 10 has the thermal radiator panels 52, 53 oriented to be generally parallel to the orbit plane. This orientation, along with satellite geometric characteristics and launch vehicle fairing envelope constraints, effectively limits the size of thermal radiator panels 52, 53 on spacecraft 10. Further complicating the heat rejection capability is the differential solar illumination as a function of inclination of the earth's axis towards the sun. As such, the seasonal changes in the sun vector versus the earth's axis of rotation change thermal radiator panel 52, 53 efficiency. In view of the many unique variables associated with an orbiting spacecraft 10, average panel temperatures might vary widely.

Since spacecraft 10 operates in space and relies on radiative heat transfer, the spacecraft's capacity to dissipate heat generated within housing 38 is proportional to the average temperature of thermal radiator panels 52, 53 on its exterior and space facing radiator surfaces, to the fourth power. Average in this case means average temperature of all points on the panel under worst case sun and equipment operational conditions and not average over time. Therefore, the higher an average radiating surface temperature, the more efficiently, per unit radiating panel area, panels 52, 53 will discharge waste heat.

Inefficiencies of 6 W/ft2, or as much as 1000 W of total dissipative capacity, are typical in spacecraft with normal radiator panels. These inefficiencies may be mitigated by adding more radiator area when possible, but this is often constrained by the launch vehicle envelope required to put the spacecraft in orbit.

As an example, if the maximum panel temperature were not limited by EPC's 43 maximum allowable temperature, additional transponders or other equipment could be carried on spacecraft 10. The additional working capacity of spacecraft 10 has the ability to generate significant additional revenue over the life of spacecraft 10.

Figure 4A:
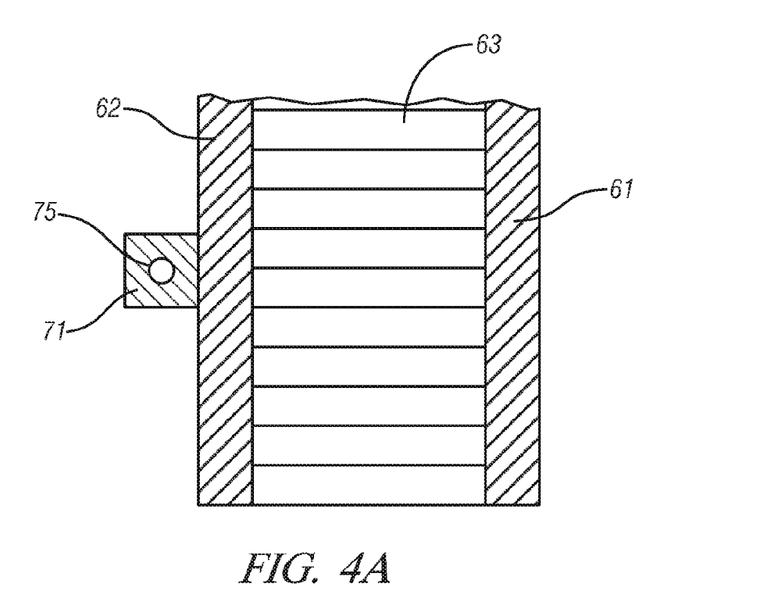
FIG. 4A is a cross-sectional view taken along line 4A of FIG. 4.
Figure 5:
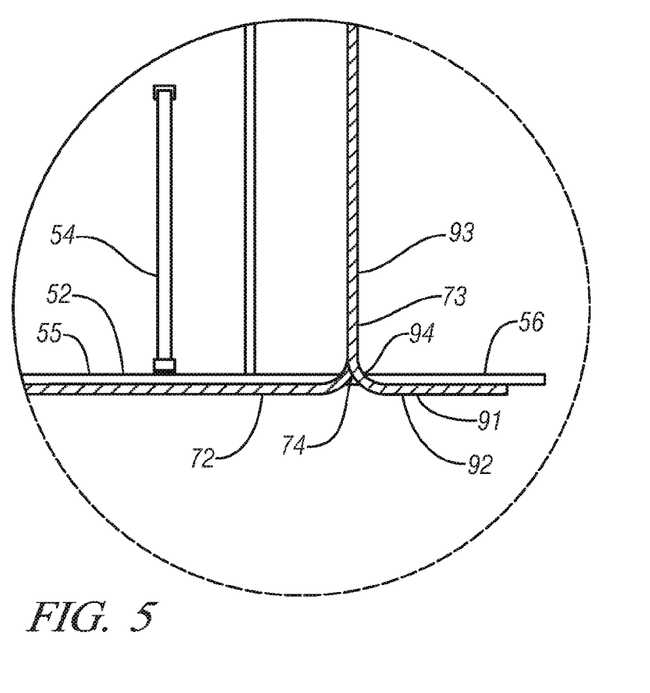
FIG. 5 is a detailed view taken from Area 5 of FIG. 4.

Referring now to FIGS. 4, 4A and 5, a plan view (nadir face 30) of a radiator system 60 for spacecraft 10 is shown. Radiator system 60 includes the north radiator panel 52 and the south radiator panel 53 mounted to spacecraft 10 via struts 54. FIG. 4A shows a cross-section of north thermal radiator panel 52. South radiator panel 53 has identical structure. Specifically each radiator panel 52, 53 is comprised of an inner face sheet 61, an outer face sheet 62 and honeycomb structure 63 disposed between face sheets 61 and 62. In the exemplary embodiment disclosed herein, radiator panels 52, 53 are constructed of aluminum, but other light weight materials or a composite of materials maybe substituted.

A first or north central heat pipe 71 is externally attached to the central zone 55 of the outer face sheet 62 of north thermal radiator panel 52. North heat pipe 71 is two-dimensional, and in the exemplary embodiment shown is "L-shaped", such that it comprises a first portion 72 that is affixed to north thermal radiator panel 52, a second portion 73 that extends generally orthogonal to first portion 72 and an elbow portion 74 interconnecting first portion 72 to second portion 73. In the exemplary embodiment shown, elbow portion 74 forms an angle of about 90 degrees between first portion 72 and second portion 73. As shown, heat pipe 71 is rectangular, has a generally square cross-sectional configuration and includes a cylindrically shaped fluid conduit 75.

A second or south central heat pipe 81 is externally attached to the central zone 56 of the outer face sheet 62 of south thermal radiator panel 53. South heat pipe 81 is also two-dimensional, and in the exemplary embodiment shown is "L-shaped", such that it comprises a first portion 82 that is affixed to south thermal radiator panel 53, a second portion 83 that extends generally orthogonal to first portion 82 and an elbow portion 84 interconnecting first portion 82 to second portion 83. In the exemplary embodiment shown, elbow portion 84 forms an angle of about 90 degrees between first portion 82 and second portion 83. As shown, heat pipe 81 is rectangular, has a generally square cross-sectional configuration and includes a cylindrically shaped fluid conduit like heat pipe 71.

A third or north edge heat pipe 91 is externally attached to the edge zone 56 of the outer face sheet 62 of north thermal radiator panel 52. North edge heat pipe 91 is two-dimensional, and in the exemplary embodiment shown is "L-shaped", such that it comprises a first portion 92 that is affixed to north thermal radiator panel 52, a second portion 93 that extends generally orthogonal to first portion 92 and an elbow portion 94 interconnecting first portion 92 to second portion 93. In the exemplary embodiment shown, elbow portion 94 forms an angle of about 90 degrees between first portion 92 and second portion 93. As shown, heat pipe 91 is rectangular, has a generally square cross-sectional configuration and includes a cylindrically shaped fluid conduit like heat pipe 71.

A fourth or south edge heat pipe 101 is externally attached to the edge zone 58 of the outer face sheet 62 of south thermal radiator panel 53. South heat pipe 101 is also two-dimensional, and in the exemplary embodiment shown is "L-shaped", such that it comprises a first portion 102 that is affixed to south thermal radiator panel 53, a second portion 103 that extends generally orthogonal to first portion 102 and an elbow portion 104 interconnecting first portion 102 to second portion 103. In the exemplary embodiment shown, elbow portion 104 forms an angle of about 90 degrees between first portion 102 and second portion 103. As shown, heat pipe 101 is rectangular, has a generally square cross-sectional configuration and includes a cylindrically shaped fluid conduit like heat pipe 71.

Each radiator panel 52, 53 includes openings 110 extending between inner face sheet 61 and outer face sheet 62 that allow heat pipes 71, 81, 91 and 101 to pass therethrough. Referring again to FIG. 2, eight "L-shaped" north central heat pipes 71 are shown thermally coupled or thermally connected at thermal connection zones 112 by interleaving adjacent pipes. Specifically, connection zone 112 is on outer face sheet 62 where first portions 72 and second portions 73 of adjacent heat pipes 71 are, in the exemplary embodiment shown, in abutting contact. "L-shaped" heat pipes 71 extend through openings 110 and are used to thermally cross-couple north and south thermal radiator panels 52, 53 at thermal connection zones 114 where first portions 72 are in abutting contact with second portions 83 of south central heat pipes 81.

Eight "L-shaped" shaped north edge heat pipes 91 are shown thermally coupled or thermally connected at thermal connection zones 114 by interleaving of adjacent pipes. Specifically, second portions 93 of adjacent heat pipes 91 are, in the exemplary embodiment shown, in abutting contact with first portions 102 of south edge heat pipes 101. In some aspects, second portions 93 of adjacent heat pipes 91 are in abutting contact with first portions 72 of north central heat pipes 71.

Referring now to FIG. 3 and with reference to FIG. 2, eight "L-shaped" south central heat pipes 81 are shown thermally connected at thermal connection zones 112 on outer face sheet 62 where first portions 82 and second portions 83 of adjacent heat pipes 81 are, in the exemplary embodiment shown, in abutting contact. "L-shaped" heat pipes 81 extend through openings 110 and are used to thermally cross-couple north and south thermal radiator panels 52, 53 at thermal connection zones 114 where first portions 82 are in abutting contact with second portions 73 of north central heat pipes 71. By thermally connecting four L-shaped pipes (two north central heat pipes 71 and two south central heat pipes 81), cross-coupling north and south thermal radiator panels 52 and 53 is accomplished. Thus, some of the heat dissipated from spacecraft 10 at the north thermal radiator panel 52 is efficiently transferred to the south thermal radiator panel 53 for dissipation—and vice versa. Approximately half of each pipe 71, 81 associated with the central zones runs along the outer face 62 of the north or south radiator panels 52, 53 in an east-west direction. The other half of each pipe 71, 81 runs along the east and west faces 34 and 35, respectively, of the spacecraft 10 in a north-south direction.

Again referring to FIG. 3 and with reference to FIG. 2, eight "L-shaped" shaped south edge heat pipes 101 are shown thermally connected at thermal connection zones 114 where second portions 103 of adjacent heat pipes 101 are, in the exemplary embodiment shown, in abutting contact with first portions 92 of north edge heat pipes 91. In some aspects, second portions 103 of adjacent heat pipes 101 are in abutting contact with first portions 82 of south central heat pipes 81. By thermally connecting eight L-shaped edge pipes (four north edge pipes 91 and four south edge pipes 101), a heat dissipation sub-zone 116 is created on north and south panels 52, 53 at the edge of spacecraft 10 adjacent the east face 34. A second heat dissipation sub-zone 116 is created on north and south panels 52, 53 at the edge of spacecraft 10 adjacent the west face 35. As used herein, the term sub-zone refers to any heat dissipation zone that is lesser that the whole of central heat dissipation zones 55, 57 or edge heat dissipation zones 56, 58. To the extent that heat pipes are interleaved in a thermal connection zone 112 or 114, they will combine to form a single heat dissipation sub-zone 115.

The exemplary embodiment of FIGS. 2 and 3 allows heat from the sunlit panel (north panel 52 or south panel 53 depending on the season) to be transferred to the shadowed panel. If the north radiator panel 52 were sunlit, heat would flow from panel 52 to the heat pipes 71 and 91 externally mounted to surface 62, then to heat pipes 81 and 101 through the east face 34 or the west face 35 pipe-to-pipe contact, then into the south thermal radiator panel 53 via the heat pipe 81 and 101 pipe to panel interface at surface 62 of panel 53.

Since the capacity for transporting heat from sunlit to shaded radiator panels 52, 53 is a function of the area of contact between radiator panel 52, 53 and cross-coupling heat pipes 71, 81, 91 and 101, adding multiple pipes, as shown in FIGS. 2 and 3, allows a satellite designer to easily and modularly add cross-coupling capacity as needed, by adding additional "L-shaped" pipes.

Figure 6:
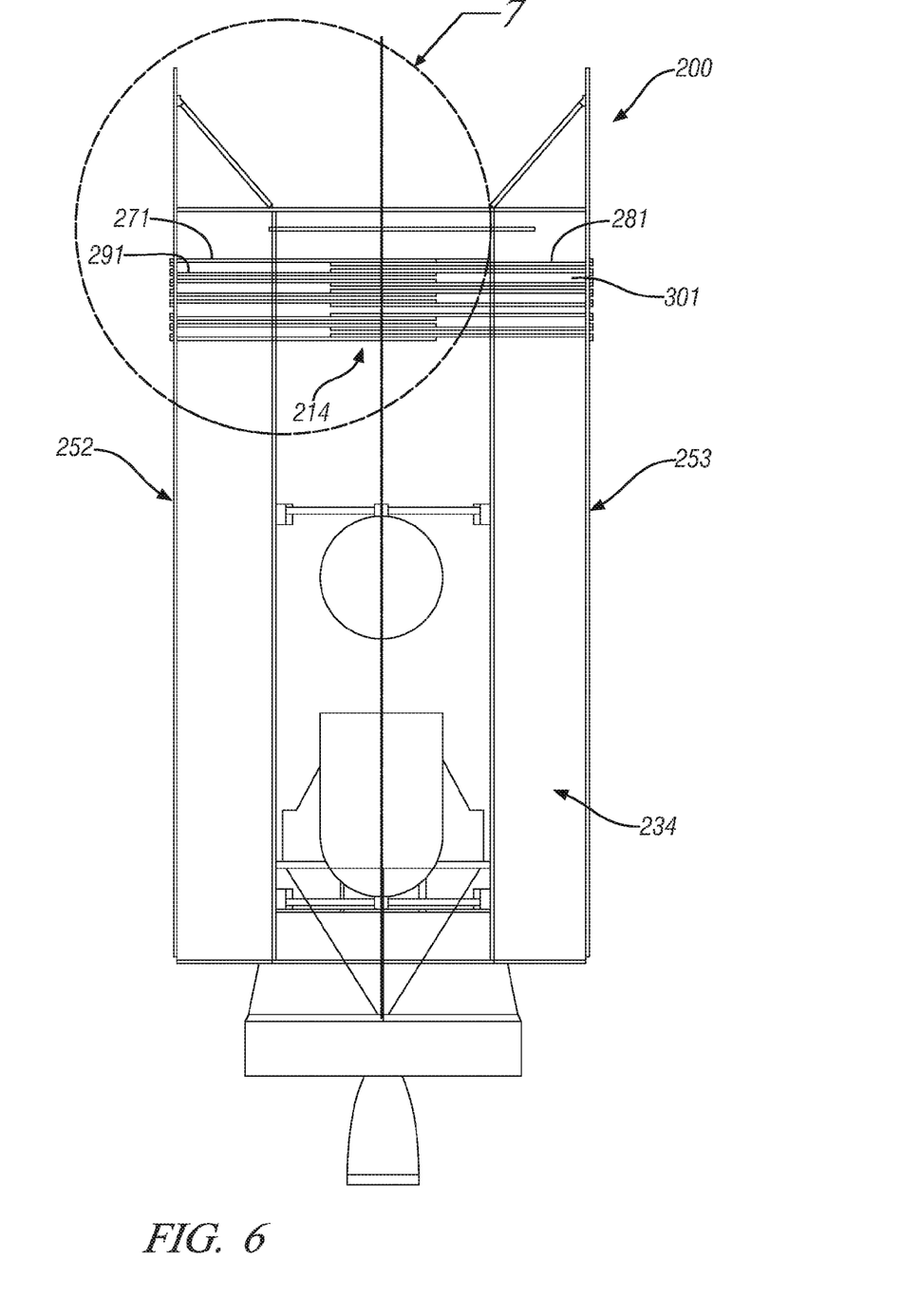
FIG. 6 is an east face view showing another aspect of the invention.
Figure 7:
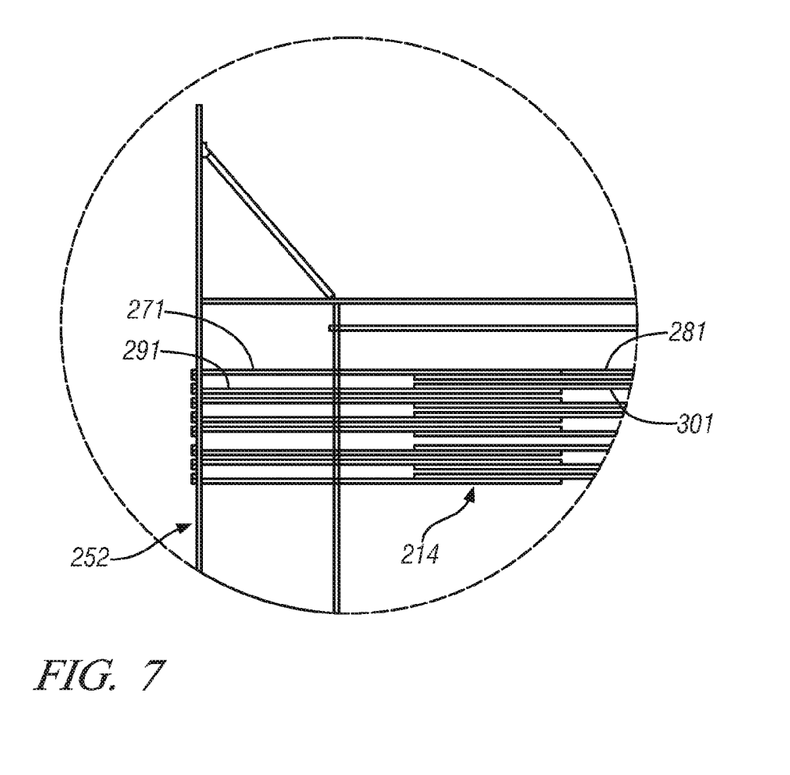
FIG. 7 is a detailed view taken from Area 7 of FIG. 6.

An alternate embodiment, as seen from east face 234 of spacecraft 200, can be seen at FIGS. 6 and 7. Central heat pipes 271 and 281 are thermally connected at thermal connection zone 214 to cross-couple north thermal radiator panel 252 to south thermal radiator panel 253. In a like manner edge heat pipes 291 and 301 cross-couple north thermal radiator panel 252 to south thermal radiator panel 253. As will be apparent from thermal connection zone 214, no more than two heat pipes are in abutting contact and there are sixteen pipes. Consequently, there are eight distinct heat dissipation sub-zones formed on each of north and south radiator panels 252 and 253 that are cross-coupled to each other. It will be further appreciated that the overall overlap within thermal connection zone 214 may be varied to improve the efficiency of heat dissipation between panels 252 and 253 as a function of time.

As a result, the temperature differential between north and south radiator panels 52, 53 is much smaller when cross-coupling heat is maximized. Furthermore, the dissipative capacity of each panel 52, 53, and therefore overall spacecraft 10 thermal capacity, can be increased. Additionally, the area of each panel 52, 53, and therefore satellite mass, might be reduced. Both options are possible due to a net improvement in spacecraft 10 thermal system efficiency.

It will be appreciated that the invention disclosed herein may also be used with a radiator panel having heat pipes embedded between the inner and outer face sheets 61, 62. An embedded heat pipe system may be separate from the external heat pipe system disclosed herein or may constitute a hybrid system as described hereinafter.

Figure 8:
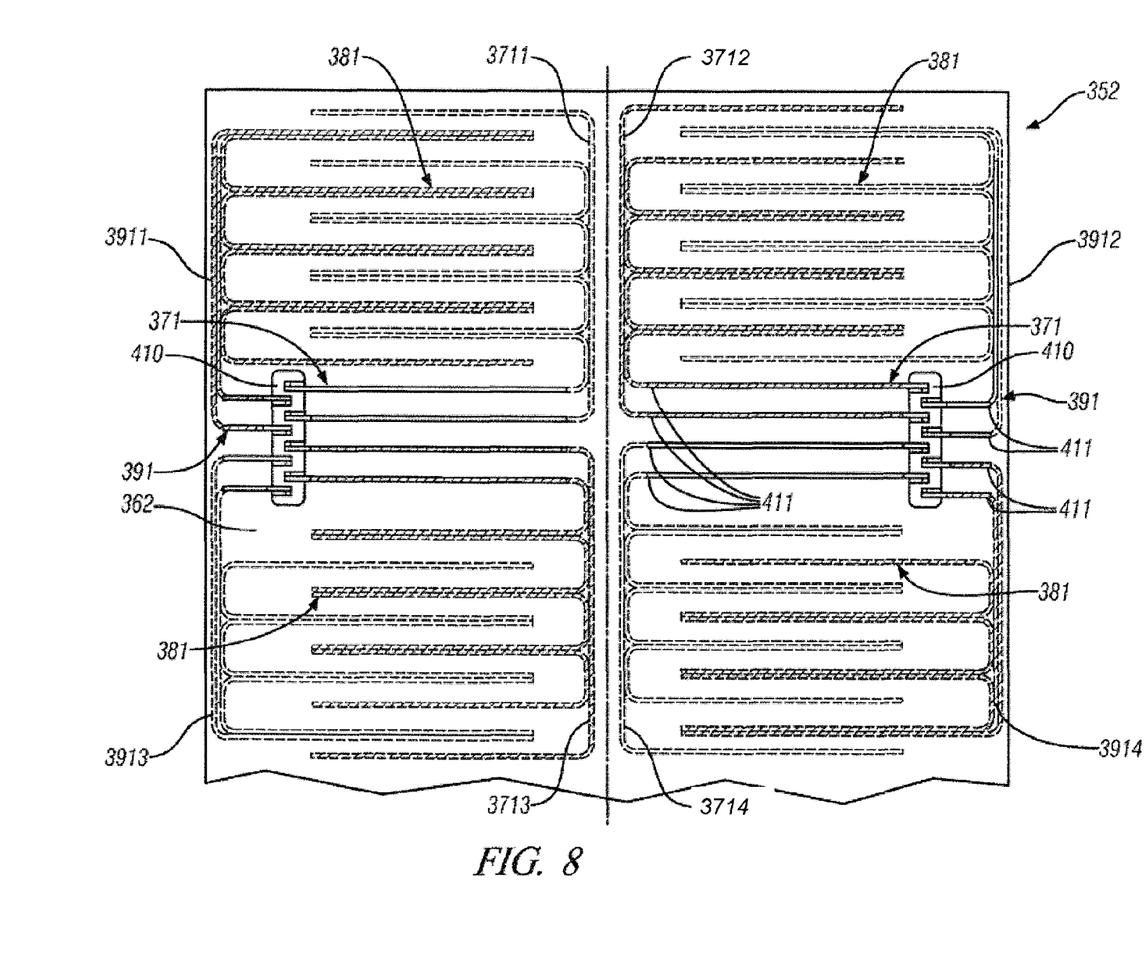
FIG. 8 is a detailed view of a radiator panel showing yet another aspect of the invention.

In yet another alternate embodiment, FIG. 8 shows a hybrid radiator panel 352 which can be substituted for any of the radiator panels disclosed herein. Hybrid radiator panel 352 includes central heat pipes 371 and edge heat pipes 391 which are externally located on an outer face 362 of hybrid radiator panel 352. Heat pipes 371 and 391 are generally shown in FIG. 8 as solid lines. Hybrid radiator panel 352 also includes embedded heat pipes 381, generally illustrated as hidden lines. Embedded heat pipes 381 are contained between outer face 362 and an inner face (not shown) of radiator panel 352.

Hybrid radiator panel 352 includes openings 410 through which L-shaped heat pipes 371 extend to a second radiator panel. At multiple interface points 411 opposite openings 410, heat pipes 371 and 391 are connected to embedded heat pipes 381. As such, in the embodiment of FIG. 8, externally located heat pipes 371 and 391 can be fluidly connected and thermally coupled to embedded heat pipes 381. In the non-limiting embodiment shown, four separate central radiator sub-zones are created, 3711, 3712, 3713 and 3714. In addition, four separate edge radiator sub-zones are created, 3911, 3912, 3913 and 3914.

Figure 9:
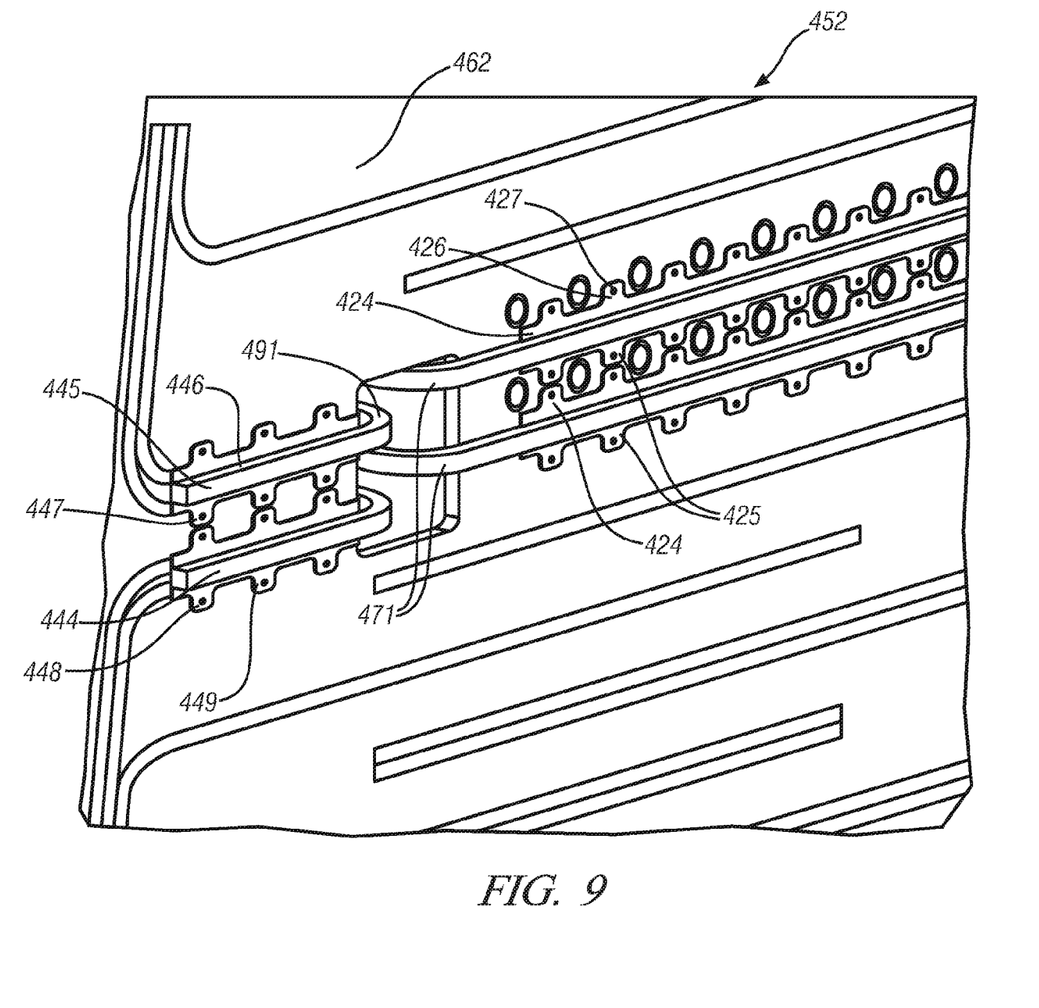
FIG. 9 is a detailed view showing a mounting aspect of the invention.

FIG. 9 shows alternate non-limiting mounting arrangements for any of the external heat pipes, generally designated as 71, 81, 91 and 101, mounted on radiator panel 52 or 53, as described in this disclosure. Reference of the mounting arrangement to a specific heat pipe or radiator panel is for clarity of description only, and is not intended to be limiting to the specific pipe shown or described. A partial section of a radiator panel 452 is shown. External heat pipes 471 are shown as including bearing flanges 424 and 425 extending therefrom. Bearing flanges 424 and 425 extend longitudinally along heat pipes 471 and are located on opposite sides of heat pipe 471. Flanges 424 and 425 are in an abutting relationship with outer face 462 of radiator panel 452. Extending from flanges 424 and 425 are ear portions 426 which provide an attachment point 427 to fasten flanges 424 and 425 to radiator panel 452.

FIG. 9 also shows an alternative mounting arrangement for heat pipes 491, which are held in place by a generally C-shaped mounting clip 444 that extends longitudinally along the heat pipe and captures the profile of heat pipe 491 therein. Mounting clip 444 includes an outward face 445 and two depending edges 446. Extending from depending edges 446 are mounting flanges 447 having ear portions 448 extending therefrom. Attachment points 449 are utilized to fasten flanges 447 and mounting 444 in place on outer surface 462 of radiator panel 452.

It will be appreciated that in the exemplary embodiments described herein, heat pipes will fall into the general categories of central heat pipes 71 and 81 or edge heat pipes 91 and 101, though the lengths of specific portions may vary depending upon the specific application of the invention. However, in other embodiments (not shown) it may be useful to bridge heat pipes, or interleave heat pipes, with straight length pipes or pipes of differing geometry. Further, as described in the exemplary embodiments herein, elbow portions of all of the heat pipes have an angle of about 90 degrees. However, it may be useful to vary the elbow angle according to specific applications of the invention or when alternate radiator panels to radiator panels 52, 53 are not generally parallel. Furthermore, in the closed system that comprises each heat pipe disclosed, it will be appreciated that the working fluid within each of the heat pipes is ammonia that evaporates when the heat pipe is exposed to heat. The ammonia liquefies when sufficiently cooled and, through capillary action, flows back to the heat source.

The invention described herein allow a spacecraft to be designed with the ability to configure as many or few pipes as necessary to meet heat transport requirements and provides enhanced efficiency relative to prior designs. The invention allows separate heat dissipation sub-zones to be easily formed and properly sized for specific heat generating components. Further, by increasing the pipe to pipe interface area at thermal connection zones, increased cross-coupling capacity and higher satellite thermal efficiency can be realized. In addition, the two dimensional heat pipes described herein are fully testable in the earth's surface gravity (i.e. a 1 g environment). Three dimensional heat pipes are not. This allows for spacecraft and satellite solutions that have a greater probability of success, since both design and workmanship testing can be executed in an environment that more accurately simulates actual mission conditions.

The present invention provides an easy modular solution for spacecraft and satellite construction. A given spacecraft design can be changed easily and quickly as component part of the satellite are added, subtracted or moved in the overall design. As such, the invention compares very favorably to alternative means of implementing added thermal dissipation capacity, including custom three dimensional cross-coupling heat pipes (which provide less capacity with much higher costs and higher risks) and deployed thermal radiators (which cost substantially more and result in an order of magnitude increase in complexity and risks).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A spacecraft comprising:
    a housing having first and second sides opposite one another;
    a first thermal radiator panel coupled to one of the first and second sides of the housing and a second thermal radiator panel coupled to the other of the first and second sides of the housing;
    at least one first heat pipe comprising a first portion that is thermally coupled to the first thermal radiator panel and a second portion, wherein no portion of the at least one first heat pipe is in contact with the second thermal radiator panel and the at least one first heat pipe is configured to transfer heat in both directions between the first and second portions of the at least one first heat pipe;
    at least one second heat pipe comprising a first portion that is thermally coupled to the second thermal radiator panel and a second portion, wherein no portion of the at least one second heat pipe is in contact with the first thermal radiator panel and the at least one second heat pipe is configured to transfer heat in both directions between the first and second portions of the at least one second heat pipe, wherein the second portion of the at least one first heat pipe and the second portion of the at least one second heat pipe are in abutting contact within a first thermal connection zone, the first thermal connection zone being separate from both the first and second thermal radiator panels; and at least one heat-generating component attached to the housing and thermally coupled to the first thermal connection zone, wherein:

each of the first thermal radiator panel and the second thermal radiator panel comprises an opening;

the at least one first heat pipe extends through the opening in the first thermal radiator panel;

the at least one second heat pipe extends through the opening in the second thermal radiator panel; and the first thermal connection zone is disposed on the housing.

2. The spacecraft of claim 1, further comprising at least one third heat pipe comprising a first portion that is thermally coupled to the first thermal radiator panel and a second portion that is disposed on the housing, wherein no portion of the at least one third heat pipe is in contact with the second thermal radiator panel and the at least one third heat pipe is configured to transfer heat in both directions between the first and second portions of the at least one third heat pipe, wherein the third heat pipe extends through a second opening in the first thermal radiator panel, wherein the first portion of the at least one third heat pipe and the first portion of the at least one first heat pipe are in abutting contact within a second thermal connection zone which is disposed on the first thermal radiator panel.

3. The spacecraft of claim 2, further comprising at least one fourth heat pipe comprising a first portion that is thermally coupled to the second thermal radiator panel and a second portion, wherein no portion of the at least one fourth heat pipe is in contact with the first thermal radiator panel and the at least one fourth heat pipe is configured to transfer heat in both directions between the first and second portions of the at least one fourth heat pipe, wherein: the at least one fourth heat pipe extends through a second opening in the second thermal radiator panel, the first portion of the at least one fourth heat pipe and the first portion of the at least one second heat pipe are in abutting contact within a third thermal connection zone which is disposed on the second thermal radiator panel, and the second portion of the at least one fourth heat pipe and the second portion of the at least one third heat pipe are in abutting contact within a fourth thermal connection zone which is disposed on the housing.

4. The spacecraft of claim 1, wherein the at least one first heat pipe and the at least one second heat pipe are generally two-dimensional in shape.

5. The spacecraft of claim 4, wherein the at least one first heat pipe and the at least one second heat pipe are generally L-shaped.

6. The spacecraft of claim 1, wherein the at least one first heat pipe and the at least one second heat pipe each comprise a mounting flange for externally attaching the respective heat pipe to the respective first and the second thermal radiator panels.

7. The spacecraft of claim 1, wherein the abutting second portions of the first and second heat pipes are thermally coupled to each other such that heat may be transferred in either direction between the first and second thermal radiator panels.

8. The spacecraft of claim 1, wherein heat is transferred from the at least one heat-generating component into the second portions of the first and second heat pipes within the first thermal connection zone and through at least one of the first and second heat pipes to the respective thermal radiator panel.

9. A spacecraft comprising:

a housing having first and second sides opposite one another;

a first thermal radiator panel coupled to one of the first and second sides of the housing and a second thermal radiator panel coupled to the other of the first and second sides of the housing;

at least one first heat pipe comprising a first portion that is thermally coupled to the first thermal radiator panel and a second portion, wherein no portion of the at least one first heat pipe is in contact with the second thermal radiator panel and the at least one first heat pipe is configured to transfer heat in both directions between the first and second portions;

at least one second heat pipe comprising a first portion that is thermally coupled to the second thermal radiator panel and a second portion, wherein no portion of the at least one second heat pipe is in contact with the first thermal radiator panel and the at least one second heat pipe is configured to transfer heat in both directions between the first and second portions of the at least one second heat pipe, wherein the second portion of the least one first heat pipe and the second portion of the at least one heat pipe are in abutting contact within a first thermal connection zone, the first thermal connection zone being separate from the both the first and the second thermal radiator panels;

at least one heat-generating component attached to the housing and thermally coupled to the first thermal connection zone; and at least one third heat-generating component attached to the housing and thermally coupled to the first thermal connection zone; and at least one third heat pipe comprising a first portion that is thermally coupled to the first thermal radiator panel and a second portion that is disposed within the first thermal connection zone, wherein no portion of the at least one third heat pipe is in contact with the second thermal second thermal radiator panel and the at least one third heat pipe is configured to transfer heat in both directions between the first and second portions of the at least one third heat pipe, wherein the second portion of the at least one third heat pipe is in abutting contact with at least one of the second portion of the at one first heat pipe and the second portion of the at one second heat pipe, wherein:

each of the first thermal radiator panel and the second thermal radiator panel comprising a center heat dissipation sub-zone and at least one edge heat dissipation sub-zone that is non-overlapping with the central heat dissipation sub-zone and is found along zone that is non-overlapping with the central heat dissipation sub-zone and is found along a perimeter of the respective thermal radiation panel, wherein each of the first thermal radiator panel and the second thermal radiator panel comprising an;

the least one first heat pipe extends through the opening in the first thermal radiator panel;

the at least one second heat pipe extends through the opening in the second thermal radiator panel;

the at least one third heat pipe extends through the opening in the first thermal radiator panel;

the first portion of the at least one first heat pipe is disposed within the central heat dissipation sub-zone of the first thermal radiator panel; and the first portion of the at least one third heat pipe is disposed within one of the at least one edge heat dissipation sub-zones of the first thermal radiation panel.

10. The spacecraft of claim 9, further comprising:

at least one fourth heat pipe comprising a first portion that is thermally coupled to the second thermal radiator panel and a second portion, wherein no portion of the at least one fourth heat pipe is in contact with the first thermal radiator panel and the at least one fourth heat pipe is configured to transfer heat in both directions between the first and second portions of the at least one fourth heat pipe, wherein:

the first portion of the at least one second heat pipe is disposed within the central heat dissipation sub-zone of the second thermal radiation panel, the first portion of the at least one fourth heat pipe is disposed within one of the at least one edge heat dissipation sub-zones of the second thermal radiation panel, the second portion of the at least one fourth heat pipe is in abutting contact with at least one of the second portion of the at least one second heat pipe and the second portion of the at least one third heat pipe.

11. The spacecraft of claim 10, wherein the second portion of the at least one first heat pipe, the second portion of the at least one second heat pipe, the second portion of the at least one third heat pipe, and the second portion of the at least one fourth heat pipe are interleaved within the first thermal connection.

12. The spacecraft of claim 9, wherein the second portion of the at least one first heat pipe, the second portion of the at least one second heat pipe, and the second portion of the at least one third heat pipe are interleaved within the first thermal connection.

13. A spacecraft comprising:

a housing having first and second sides opposite one another;

a first thermal radiator panel coupled to one of the first and second sides of the housing and a second thermal radiator panel coupled to the other of the first and second sides of the housing;

at least one first heat pipe comprising a first portion that is thermally coupled to the first thermal radiator panel and a second portion, wherein no portion of the at least one first heat pipe is in contact with the second thermal radiator panel and the at least one first heat pipe is configured to transfer heat in both directions between the first and second portions of the at least one first heat pipe;

at least one second heat pipe comprising a first portion that is thermally coupled to the second thermal radiator panel and a second portion, wherein no portion of the at least one second heat pipe is in contact with the first thermal radiator panel and the at least one second heat pipe is configured to transfer heat in both directions between the first and second portions of the at least one second heat pipe;

at least one third heat pipe comprising a first portion that is thermally coupled to the first thermal radiator panel and a second portion, wherein no portion of the at least one third heat pipe is in contact with the second thermal radiator panel and the at least one third heat pipe is configured to transfer heat in both directions between the first and second portions of the at least one third heat pipe;

at least one fourth heat pipe comprising a first portion that is thermally coupled to the second thermal radiator panel and a second portion, wherein no portion of the at least one fourth heat pipe is in contact with the first thermal radiator panel and the at least one fourth heat pipe is configured to transfer heat in both directions between the first and second portions of the at least one fourth heat pipe;

wherein:

the second portion of the at least one first heat pipe, the second portion of the at least one second heat pipe, the second portion of the at least one third heat pipe, and the second portion of the at least one fourth heat pipe are interleaved within a first thermal connection zone that is separate from both the first and second thermal radiator panels;

each of the first thermal radiator panel and the second thermal radiator panel comprises an opening;

the at least one first heat pipe and the at least one third heat pipe extend through the opening in the first thermal radiator panel;

the at least one second heat pipe and the at least one fourth heat pipe extend through the opening in the second thermal radiator panel;

the first thermal connection zone is disposed on the housing; and at least one heat-generating component is attached to the housing and thermally coupled to the first thermal connection zone.

* * * * *